(12) United States Patent
Sharifi et al.

(10) Patent No.: US 9,098,576 B1
(45) Date of Patent: Aug. 4, 2015

(54) ENSEMBLE INTEREST POINT DETECTION FOR AUDIO MATCHING

(75) Inventors: Matthew Sharifi, Zurich (CH);
Gheorghe Postelnicu, Zurich (CH);
George Tzanetakis, Victoria (CA);
Dominik Roblek, Ruschlikon (CH)

(73) Assignee: Google Inc., Mountain View, CA (US)

( * ) Notice: Subject to any disclaimer, the term of this patent is extended or adjusted under 35 U.S.C. 154(b) by 324 days.

(21) Appl. No.: 13/274,725

(22) Filed: Oct. 17, 2011

(51) Int. Cl.
*G06F 17/00* (2006.01)
*G06F 17/30* (2006.01)

(52) U.S. Cl.
CPC ................................ *G06F 17/30743* (2013.01)

(58) Field of Classification Search
CPC .................... G06F 17/30743; G06F 17/30758; G06F 17/30017; G06F 17/30746; G10L 15/02
See application file for complete search history.

(56) References Cited

U.S. PATENT DOCUMENTS

| | | | |
|---|---|---|---|
| 6,453,252 B1 | 9/2002 | Laroche | |
| 6,721,488 B1 | 4/2004 | Dimitrova et al. | |
| 7,516,074 B2 | 4/2009 | Bilobrov | |
| 7,809,580 B2 | 10/2010 | Hotho et al. | |
| 2001/0044719 A1* | 11/2001 | Casey | 704/245 |
| 2002/0023020 A1 | 2/2002 | Kenyon et al. | |
| 2002/0083060 A1* | 6/2002 | Wang et al. | 707/10 |
| 2002/0181711 A1* | 12/2002 | Logan et al. | 381/1 |
| 2008/0201140 A1* | 8/2008 | Wells et al. | 704/231 |
| 2009/0012638 A1 | 1/2009 | Lou | |

OTHER PUBLICATIONS

MusicBrainz—The Open Music Encyclopedia, http://musicbrainz.org, Last accessed Apr. 12, 2012.
Shazam, http://www.shazam.com, Last accessed Apr. 19, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed Jul. 11, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed Jul. 11, 2012.

* cited by examiner

*Primary Examiner* — Curtis Kuntz
*Assistant Examiner* — Thomas Maung
(74) *Attorney, Agent, or Firm* — Amin, Turocy & Watson, LLP

(57) ABSTRACT

Systems and methods for audio matching are disclosed herein. In one embodiment, a system includes both interest point mixing and fingerprint mixing by using multiple interest point detection methods in parallel. Since multiple interest point detection methods are used in parallel, accuracy of audio matching is improved across a wide variety of audio signals. In addition the scalability of the disclosed audio matching system is increased by matching the fingerprint of an audio sample with a fingerprint of a reference sample versus matching an entire spectrogram. Accordingly, a more accurate and more general solution to audio matching can be accomplished.

12 Claims, 13 Drawing Sheets

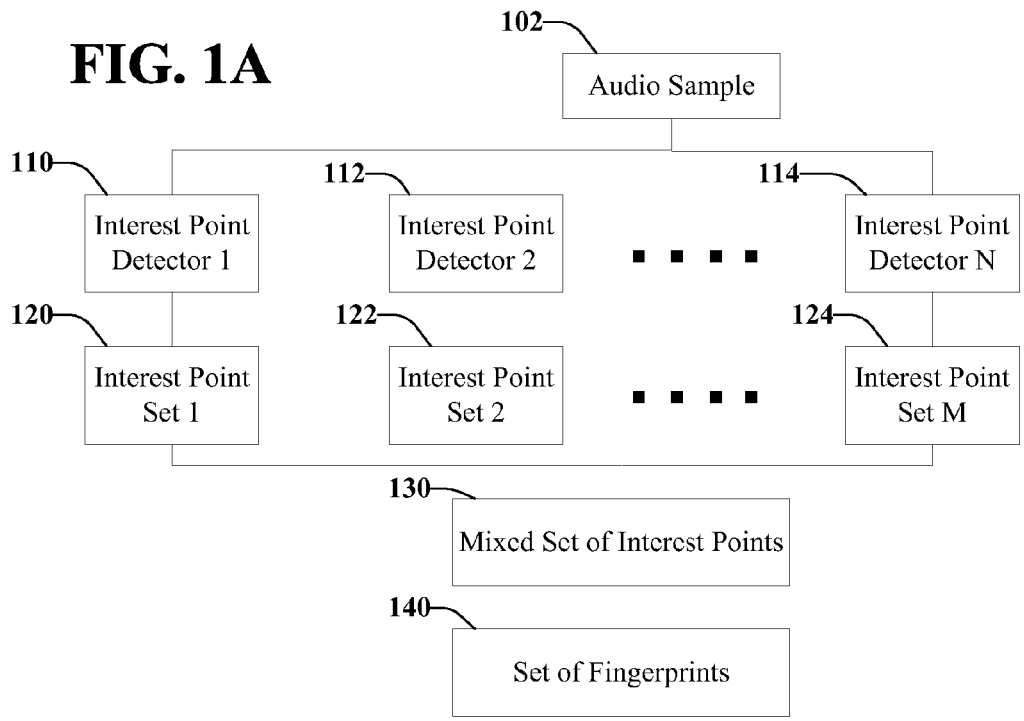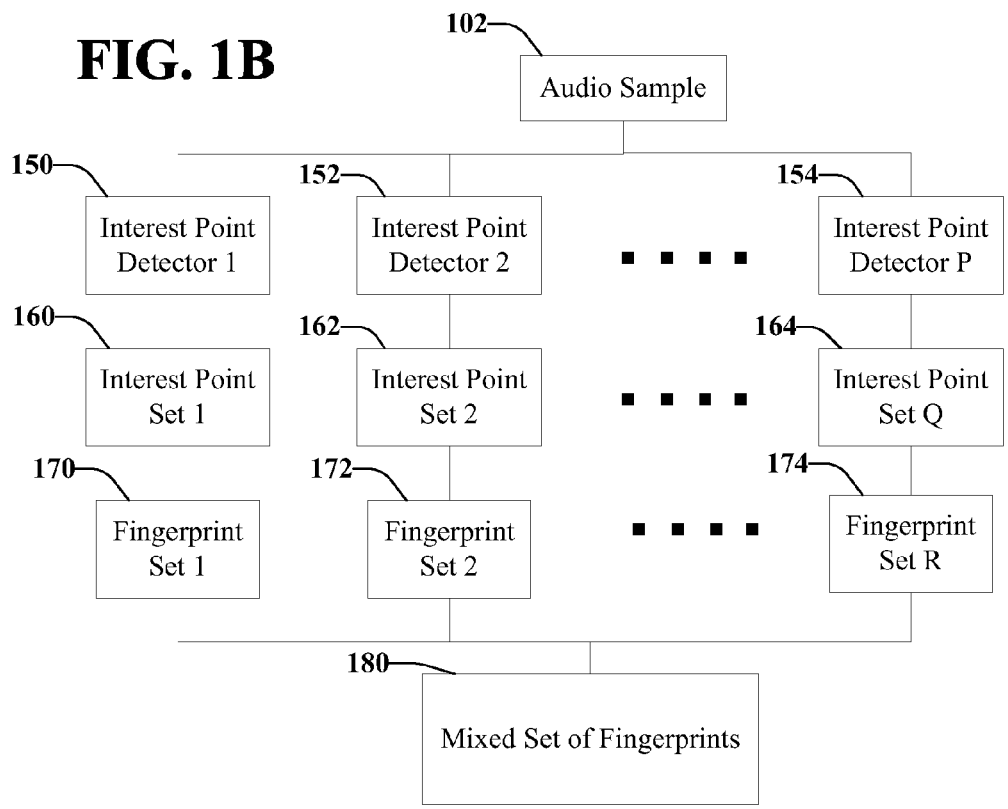

ENSEMBLE INTEREST POINT DETECTION FOR AUDIO MATCHING

TECHNICAL FIELD

This application relates to audio matching, and more particularly to efficient and accurate identification of audio samples.

BACKGROUND

Audio samples can be recorded by many commercially available electronic devices such as smart phones, tablets, e-readers, computers, personal digital assistants, personal media players, etc. Audio matching provides for the identification of a recorded audio sample by comparing the audio sample to a set of reference samples. To make the comparison, an audio sample can be transformed to a time-frequency representation of the sample by using, for example, a short time Fourier transform (STFT). Using the time-frequency representation, interest points that characterize the time and frequency locations of peaks or other distinct patterns of the spectrogram can then be extracted from the audio sample. Fingerprints or descriptors can then be computed as functions of sets of interest points.

There are a number of possible interest point detection methods that differ in how the time-frequency representation is constructed or in the parameters that define what constitutes a unique point in the spectrogram. Different interest point detection methods are effective to varying extents, depending on the nature of the underlying audio signal. For example, some interest point detection methods may perform better for samples with heavy percussion whereas other detection methods may perform better for samples of classical music. Furthermore, different interest point detection methods may perform better with speech versus music.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to audio matching. An interest point detection component concurrently employs two or more interest point detection methods to generate a set of respective interest points for an audio sample. A mixing component generates a mixed set of interest points for the audio sample based on the set of respective interest points. A fingerprint component generates a fingerprint of the audio sample based on the mixed set of interest points. A matching component identifies the audio sample based upon comparing the fingerprint of the audio sample with reference fingerprints.

In an additional non-limiting example, an interest point detection component concurrently employs two or more interest point detection methods to generate at least a first set of interest points for an audio sample based on a first interest point detection method and a second set of interest points for the audio sample based on a second interest point detection method. A fingerprint component generates a first set of fingerprints based upon the first set of interest points and a second set of fingerprints based upon the second set of interest points. A fingerprint mixing component generates a mixed set of fingerprints based upon at least the first set of fingerprints and the second set of fingerprints. A matching component identifies the audio sample based upon comparing the mixed set of fingerprints with reference fingerprints.

In another non-limiting example, an interest point detection component concurrently employs two or more interest point detection methods to generate at least a first set of interest points for an audio sample based on a first interest point detection method and a second set of interest points for the audio sample based on a second interest point detection method. A fingerprint component generates a first set of fingerprints based upon the first set of interest points and a second set of fingerprints based upon the second set of interest points. A matching score component generates a first matching score based upon comparing the first set of fingerprints with a first set of reference fingerprints and a second matching score based upon comparing the second set of fingerprints with the first set of reference fingerprints. A matching score mixing component identifies the audio sample based upon at least the first matching score and the second matching score.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

FIG. 1A illustrates a graphical block diagram example of interest point mixing;

FIG. 1B illustrates a graphical block diagram example of fingerprint mixing;

DETAILED DESCRIPTION

Figure 2:
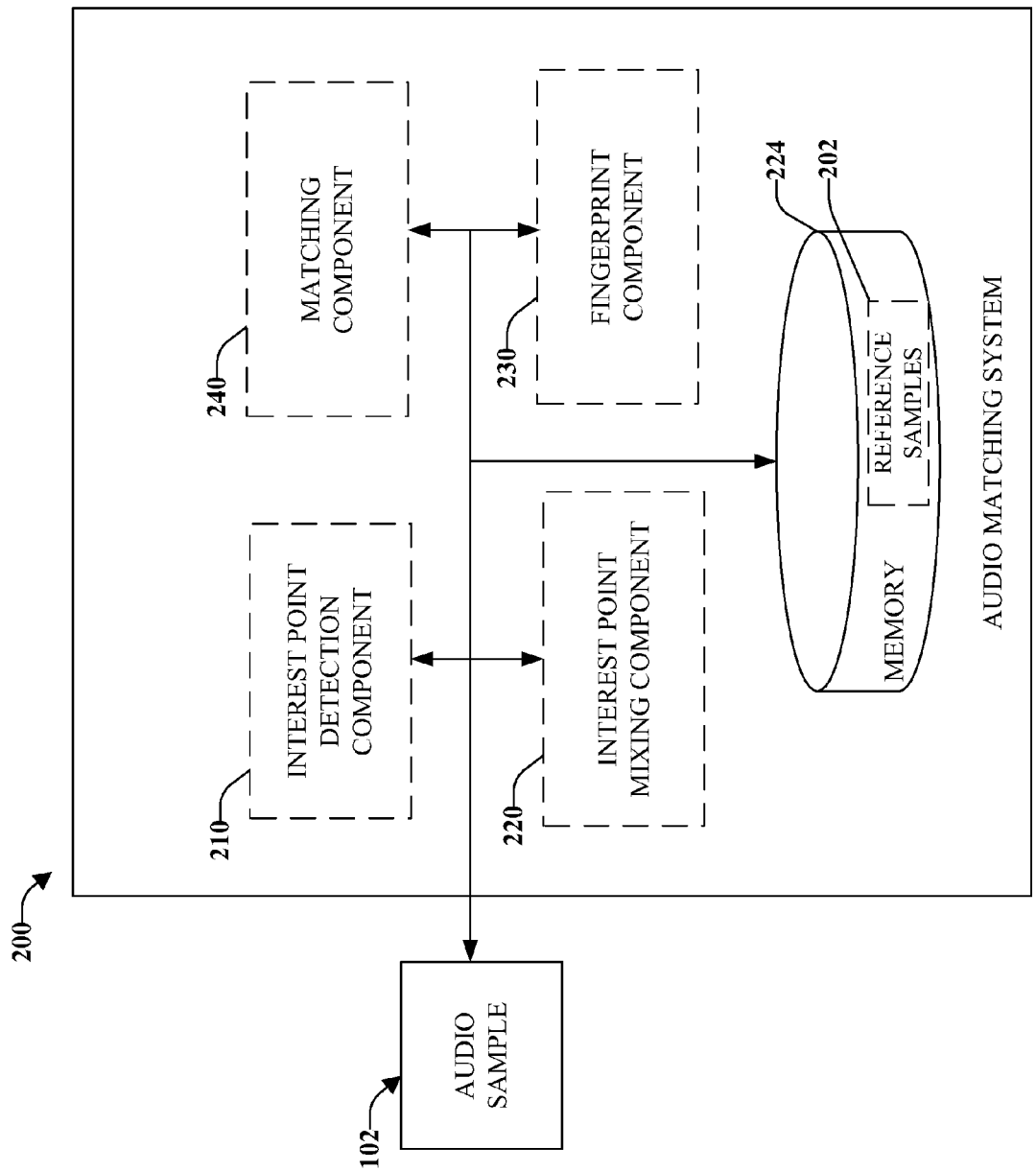
FIG. 2 illustrates a high-level functional block diagram of an example audio matching system using interest point mixing.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio matching generally involves analyzing an audio sample for unique characteristics such as interest points capable of being compared to unique characteristics of reference samples to identify the audio sample. Systems and methods disclosed herein provide for using multiple interest point detection methods in parallel to more efficiently identify an audio sample. Also, embodiments of the audio matching systems disclosed herein provide for a highly scalable solution to audio matching.

One way to compare two audio samples is through use of a spectrogram. A spectrogram represents an audio sample by plotting time on a horizontal axis and frequency on a vertical axis. Additionally, the amplitude or intensity of a certain frequency at a certain time can also be incorporated into the spectrogram by using color or a third dimension.

There are several different techniques in creating a spectrogram. One technique involves using a series of bandpass filters which can filter an audio sample at a specific frequency and measure amplitude of the audio sample at that specific frequency over time. The audio sample can be run through additional filters to individually isolate a plurality of frequencies to measure the amplitude of the plurality of frequencies over time. A spectrogram is created by combining all the frequency measurements over time on the vertical frequency axis which creates a spectrogram image of frequency amplitudes over time.

A second technique involves using short-time Fourier transform ("STFT") to break down an audio sample into time windows, where each window is Fourier transformed to calculate the magnitude of the frequency spectrum for the duration of each window. Combining a plurality of windows side by side on the horizontal time axis of the spectrogram creates an image of frequency amplitudes over time. Other techniques, such as wavelet transforms, can also be used to construct a spectrogram.

Creating and storing in a database an entire spectrogram for each reference sample can require large amounts of storage space and affect scalability of an audio matching system. Additionally, using an entire spectrogram to compare two audio samples is generally not tolerant to noise as the presence of noise can alter both the frequency and timing of sound events. Therefore, it is desirable to have more compact descriptors of an audio sample that also are robust to noise. One method of creating these compact descriptors ("fingerprints") is to first calculate individual interest points that identify unique characteristics of local features of the time-frequency representation of the reference sample. Fingerprints can then be computed as functions of sets of interest points, which are much more compact in terms of size than an entire spectrogram. The disclosed systems and methods provide for the storing of fingerprints of reference samples in memory and using those reference fingerprints in comparison to fingerprints of an audio sample to identify the identity of the audio sample.

Interest points identify unique characteristics of an audio sample. In one example, an interest point could be a spectral peak of a specific frequency over a specific window of time. Interest points could also include the timing of the onset of a note, or any suitable unique spectral event over a specific duration of time. For example, when using STFT to detect interest points, adjusting the size of the window may affect the spectral peak over the duration of that window. Thus, different interest point detection methods can be accomplished by adjusting the threshold of a spectral level indicative of an interest point or by adjusting the amount of time in each STFT window.

Differing interest point detection methods are useful to varying extents depending on the nature of the underlying audio signal. For example, spectral peaks in STFT slices computed with a narrow window make it easier to identify a precise time when a signal changes frequencies, but the precise frequency may not be easily discernable. In contrast, spectral peaks in STFT slices computed with a wide window make the frequency of notes more easily identifiable but the timing of the frequency change can become difficult to discern. Thus, a first interest point detection method may perform better with samples where the onset of notes or vocals is unique, whereas a second interest point detection method may perform better with samples with easily identifiable pitches or tones.

As discussed in greater detail below, various implementations provide for using multiple interest point detection methods in parallel in order to improve audio matching performance across different types of audio signals.

Referring initially to FIG. 1A there is illustrated a graphical example of interest point mixing. Audio Sample 102 can be used by a first interest point detector 110 to generate a first set of interest points 120. Audio sample 102 can also be used by second interest point detector 112 to generate a second set of interest points 122. An Nth interest point detector 114 (N is an integer) can generate a Mth set of interest points 124 (M is an integer) based on audio sample 102. In an exemplary implementation, N=M. It is to be appreciated that any suitable number of interest point detectors can generate sets of interest points in parallel with implementations described in this disclosure.

A mixed set of interest points 130 can be generated from M sets of interest points 120, 122, and 124. A set of fingerprints 140 can be generated from the mixed set of interest points 130. It is to be appreciated that set of fingerprints 140 can then be compared to reference fingerprints (not shown) to identify audio sample 102 in accordance with implementations described in this disclosure.

It can be further appreciated that using the mixed set of interest points 130 to create set of fingerprints 140 allows for the combination of interest points from different detection methods where certain detection methods may perform better depending on the nature of the audio sample 102. Combining multiple interest point detection methods in parallel can improve the performance of audio matching across different types of audio samples.

Referring now to FIG. 1B there is illustrated a graphical example of fingerprint mixing. First interest point detector 150 can generate a first set of interest points 160 based on audio sample 102. First set of fingerprints 170 can be generated based on first set of interest points 160. Second interest point detector 152 can generate a second set of interest points 162 based on audio sample 102. Second set of fingerprints 172 can be generated based on second set of interest points 162.

A Pth interest point detector 154 (P is an integer) can generate a Qth set of interest points 164 (Q is an integer) based on audio sample 102. Rth set of fingerprints 174 (R is an integer) can be generated based on Qth set of interest points 164. In an exemplary implementation, P=Q=R. It is to be appreciated that any suitable number of interest point detectors, sets of interest points, and sets of fingerprints can be generated in parallel with implementations described in this disclosure.

It can be appreciated that fingerprint mixing can treat each interest point detector, and corresponding sets of interest points, separately and compute a separate set of fingerprints for each interest point detection method. The resulting fingerprints can then be mixed together to create mixed set of fingerprints 180. Mixed set of fingerprints 180 can then be compared to reference fingerprints (not shown) to identify audio sample 102 in accordance with implementations described in this disclosure. Combining multiple fingerprint detection methods in parallel can improve the performance of audio matching across different types of audio samples.

FIG. 2 illustrates a high-level functional block diagram of a non-limiting example audio matching system 200 using interest point mixing. Interest point detection component 210 can employ (concurrently, serially, or a combination thereof) two or more interest point detection methods to generate a set of respective interest points for an audio sample 102.

Interest point mixing component 220 can generate a mixed set of interest points for the audio sample 102 based on the set of respective interest points generated by interest point detection component 210. Interest point mixing component 220 can determine what detection methods were used by interest point detection component 210 and use such information to intelligently mix sets of interest points that were generated using differing methods. For example, interest point mixing component 220 may determine that differing STFT windows were used by interest point detection component 210 to generate different sets of interest points for audio sample 102. Interest point mixing component 220 may use that information to normalize the data so that the set of mixed interest points contains interest points with identical windows.

Fingerprint component 230 can generate fingerprints of audio sample 102 based on the mixed set of interest points (e.g., mixed set of interest points 130). Matching component 240 can identify the audio sample 102 based upon comparing the fingerprint of the audio sample with fingerprints of reference samples 202 (stored in memory 224). It is understood and appreciated that fingerprints of reference samples 202 can be previously computed and stored in memory 224.

In one implementation, mixing component 220 can generate the mixed set of interest points by assigning a first weight to a first set of interest points and a second set weight to a second set of interest points. For example, through a process of machine learning, the accuracy of certain interest point detection methods can be learned and weights can be determined as representations of confidence scores regarding the probable accuracy of one interest point detection method versus another. Those interest point detection methods that have a higher probability of success can be weighted more heavily in the mixed set of interest points. As another example, weights can be predetermined based upon, for example, a source of the audio sample (e.g., radio, mobile phone, computer, optical disk, etc.) or type of the audio sample (e.g., whether it is a speech or song, musical genre, etc.). In one implementation, the source or type is determined by and/or using a classification component, e.g., classification component 310 shown in FIG. 3.

Figure 3:
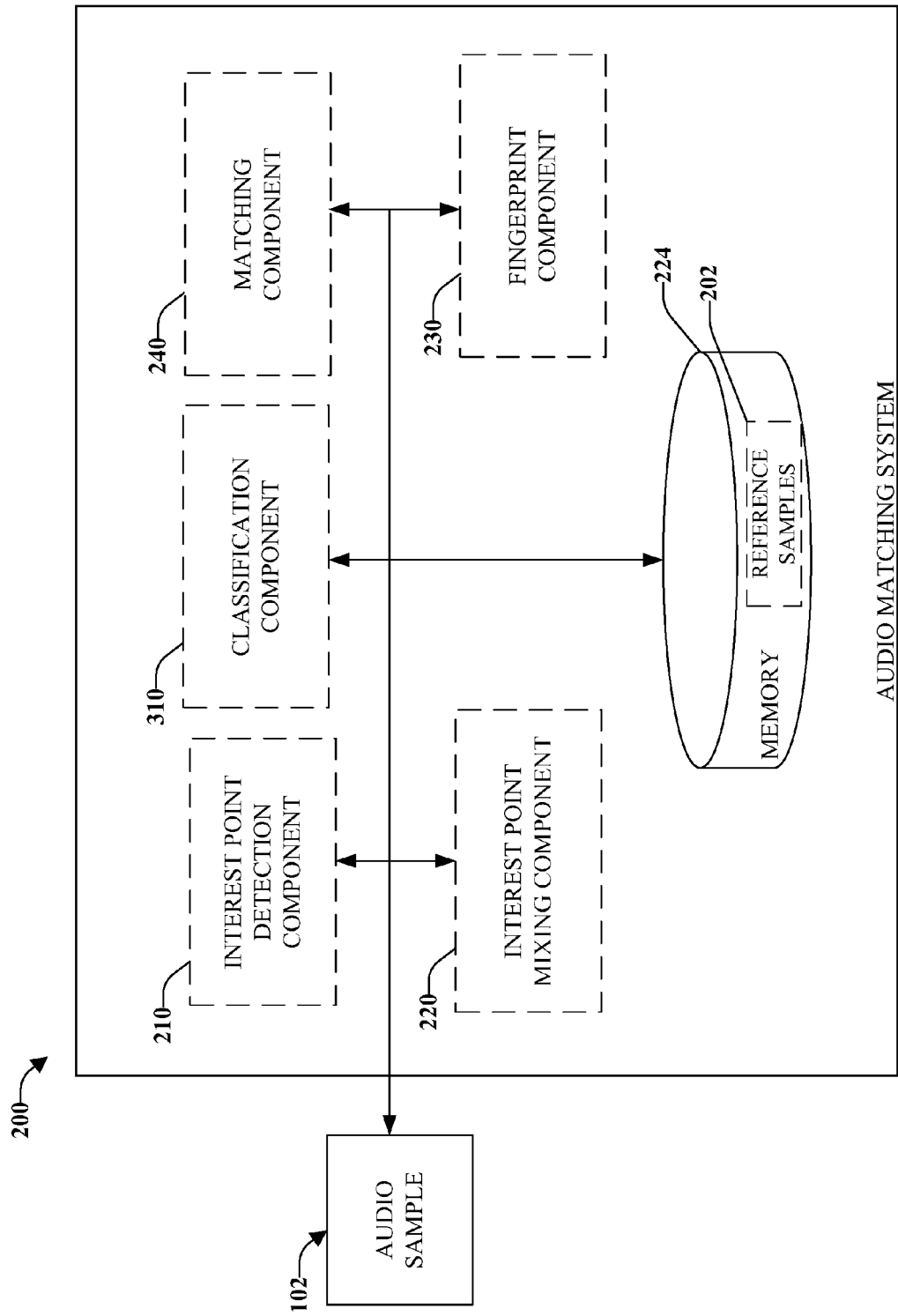
FIG. 3 illustrates a high-level functional block diagram of an example audio matching system using classification and interest point mixing.

Turning now to FIG. 3, illustrated is an implementation of the audio matching system 200 using a classification component 310 that can probe audio sample 102 and classify the audio sample. It is to be appreciated that in classifying the audio sample 102, it can be determined which interest point detection methods will have a higher probability of success in matching audio sample 102 to reference samples 202.

Accordingly, in one embodiment, interest point mixing component 220 can assign weights based upon the classification of the audio sample 102 by classification component 310. Classifications can be based on, for example, the source of the audio (e.g., radio, mobile phone, computer, optical disk, etc.); whether the audio contains speech, music, or both speech and music; what genre of music the audio is related to; or whether the audio is related to television, movies, or both television and movies. For example, through a process of machine learning, the accuracy of certain interest point detection methods with certain classes of audio samples can be learned and weights can be determined to represent confidence scores regarding the accuracy of one interest point detection method versus other methods for each class. Those interest point detection methods that have a higher probability of success for a class can be weighted more heavily in the mixed set of audio sample 102.

Figure 4:
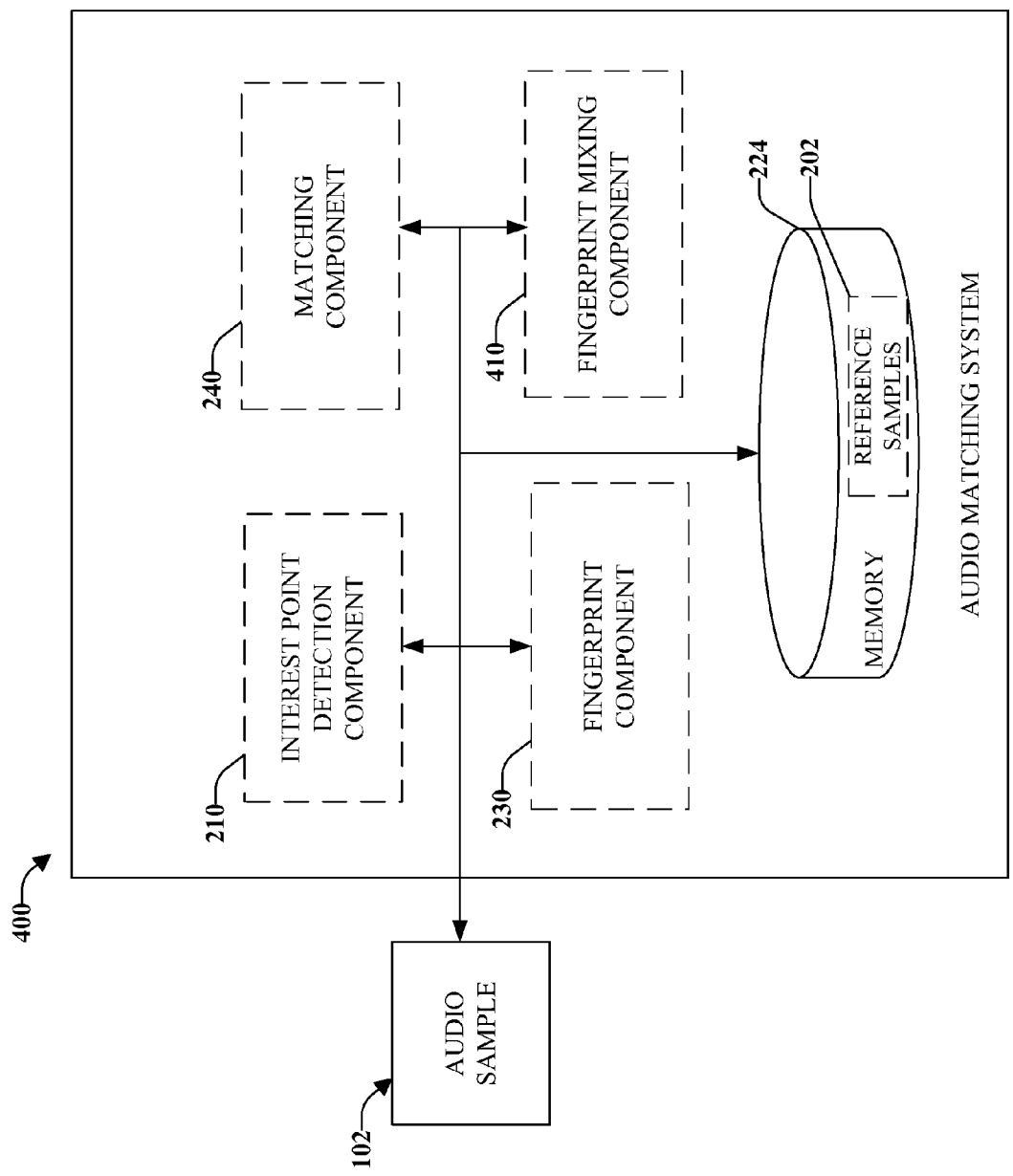
FIG. 4 illustrates a high-level functional block diagram of an example audio matching system using fingerprint mixing.

Referring now to FIG. 4, illustrated is a high-level functional block diagram of audio matching system 400 using fingerprint mixing. Interest point detection component 210 can employ (concurrently, serially, or a combination thereof) two or more interest point detection methods to generate at least a first set of interest points (e.g., interest point set 160) for an audio sample based on a first interest point detection method and a second set of interest points (e.g., interest point set 162) for the audio sample based on a second interest point detection method. Fingerprint component 230 can generate a first set of fingerprints based upon the first set of interest points and a second set of fingerprints based upon the second set of interest points. It is to be appreciated that fingerprint component 230 can generate additional sets of fingerprints for additional sets of interest points generated by interest point detection component 210.

Fingerprint mixing component 410 can generate a mixed set of fingerprints (e.g., mixed set of fingerprints 180) based upon at least the first set of fingerprints and the second set of fingerprints. The fingerprint mixing component 410 can generate a mixed set of fingerprints based on a plurality of sets of fingerprints generated by fingerprint component 230.

In one implementation, fingerprint mixing component 410 can generate the mixed set of fingerprints by assigning a first weight to the first set of fingerprints and a second weight to the second set of fingerprints. For example, through a process of machine learning, the accuracy of certain interest point detection methods and corresponding fingerprints can be learned and the weights can be determined to represent confidence scores regarding the accuracy of each interest point detection method and corresponding fingerprints. Those fingerprints that have a higher probability of success can be weighted more heavily in the mixed set of fingerprints. As another example, weights can be predetermined based upon, for example, a source of the audio sample (e.g., radio, mobile phone, computer, optical disk, etc.) or type of the audio sample (e.g., whether it is a speech or song, a related musical genre, whether it is related to television or movies, etc.). In one implementation, the source or type is determined by and/or using a classification component, e.g., classification component 310 shown in FIG. 5. It can be appreciated that additional weights can be assigned to additional sets of fingerprints in accordance with the subject disclosure.

Matching component 240 can identify the audio sample 102 by comparing the mixed set of fingerprints generated by fingerprint mixing component 410 with fingerprints of reference samples 202.

Figure 5:
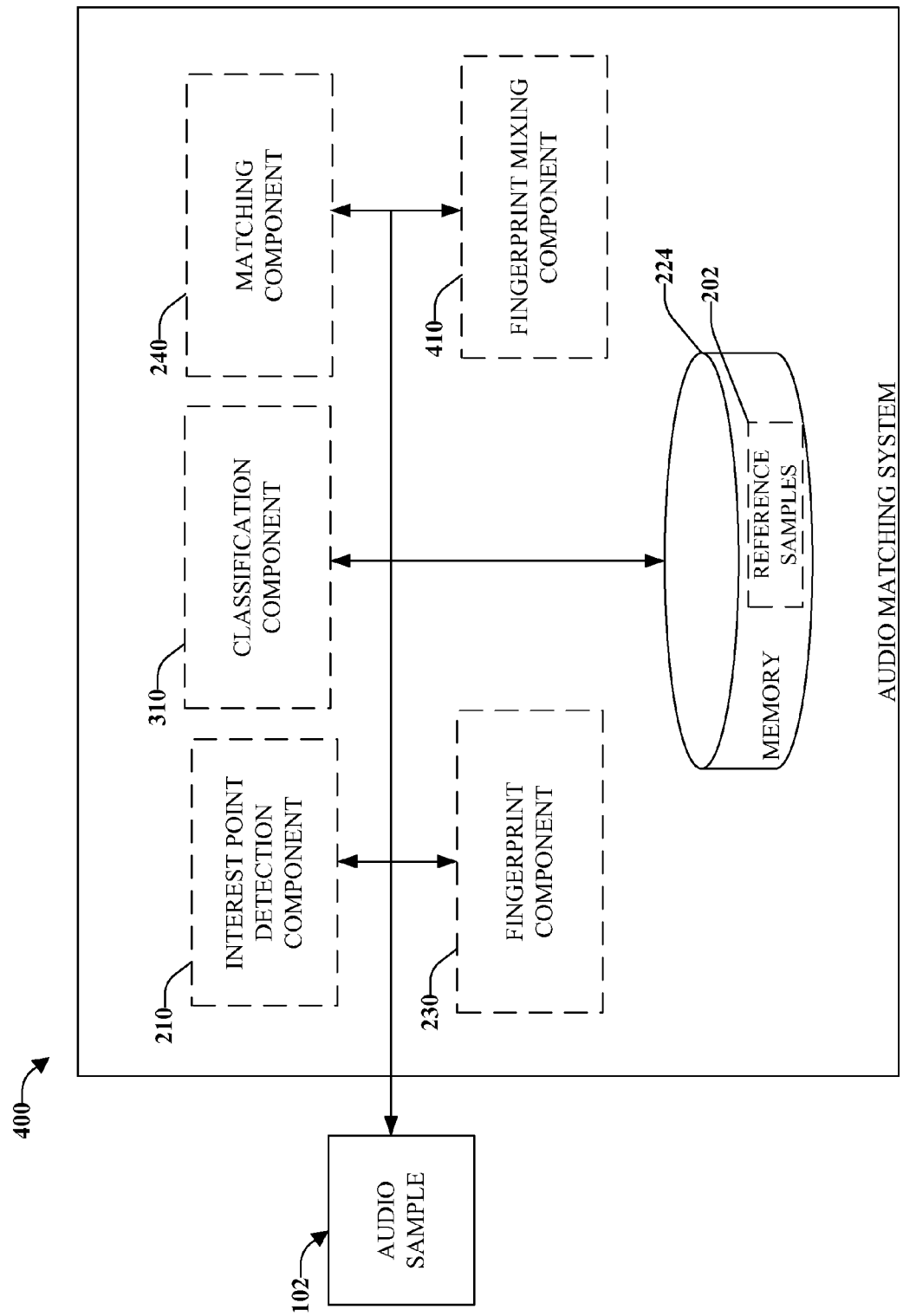
FIG. 5 illustrates a high-level functional block diagram of an example audio matching system using classification and fingerprint mixing.

Referring now to FIG. 5 illustrated is a high-level functional block diagram of audio matching system 400 including a classification component 310 that can probe audio sample 102 and classify it. In classifying audio sample 102, it can be determined which interest point detection methods, and corresponding sets of fingerprints, will have a higher probability of success in matching audio sample 102 to reference samples 202.

Accordingly, in one embodiment, fingerprint mixing component 410 can assign a first weight to a first set of fingerprints and a second weight to a second set of fingerprints. Fingerprint mixing component 410 can assign weights based upon the classification of the audio sample 102 by classification component 310. Classifications can be based on, for example, the source of the audio (e.g., radio, mobile phone, computer, optical disk, etc.); whether the audio contains speech, music, or both speech and music; what genre of music the audio is related to; or whether the audio is related to television, movies, or both television and movies. For example, through a process of machine learning, the accuracy of interest point detection methods with classes of audio samples can be learned and the weights can be determined to represent confidence scores regarding the accuracy of an interest point detection method, and corresponding set of fingerprints, for that class of audio. In one implementation, those interest point detection methods, and corresponding fingerprints, that have a higher probability of success for a class can be weighted more heavily in generating a particular mixed set of fingerprints.

Figure 6:
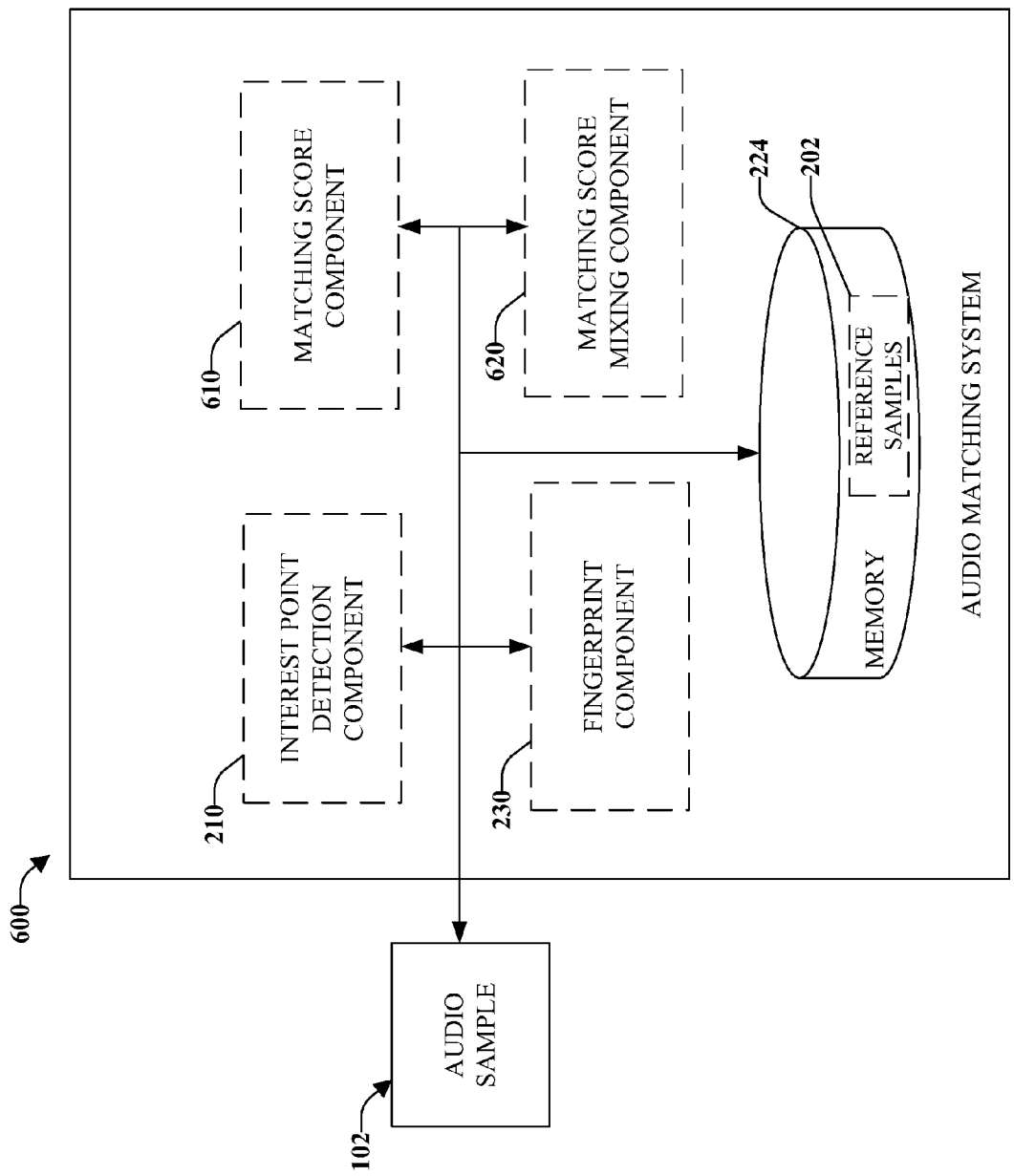
FIG. 6 illustrates a high-level functional block diagram of an example audio matching system using matching score mixing.

Referring now to FIG. 6, illustrated is a high-level functional block diagram of audio matching system 600 using matching score mixing. Interest point detection component 210 can employ (concurrently, serially, or a combination thereof) two or more interest point detection methods to generate at least a first set of interest points for an audio sample based on a first interest point detection method and a second set of interest points for the audio sample based on a second interest point detection method. Fingerprint component 230 can generate a first set of fingerprints based upon the first set of interest points and a second set of fingerprints based upon the second set of interest points. It can be appreciated that fingerprint component 230 can generate additional sets of fingerprints for additional sets of interest points generated by interest point detection component 210.

System 600 can include matching score component 610 that can generate a first matching score based upon comparing the first set of fingerprints generated by fingerprint component 230 with fingerprints of reference samples 202. Matching score component 610 can further generate a second matching score based upon comparing the second set of fingerprints generated by fingerprint component 230 with fingerprints of reference samples 202. Matching scores can represent the probability that audio sample 102 matches an individual reference sample. In one embodiment, matching scores can also include a plurality of probabilities that audio sample 102 matches a plurality of reference samples wherein the matching score for each reference sample is based upon the probability that the audio sample 102 matches that individual reference sample.

In another aspect, matching score mixing component 620 can identify the audio sample based upon at the least the first matching score and the second matching score generated by matching component 610. It can be appreciated that matching score mixing component 620 can use sets of matching scores containing a plurality of probabilities that audio sample 102 matches a plurality of reference samples to predict whether there is match between audio sample 102 and an individual reference sample. Machine learning techniques can be used by matching score mixing component 620 in using matching scores to identify audio sample 102. For example, matching score mixing component 620 can employ a trained classifier, as discussed in greater detail below that can infer the identity of the audio sample 102 using the sets of matching scores.

FIGS. 7-11 illustrate methodologies and/or flow diagrams in accordance with this disclosure. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methodologies.

Figure 7:
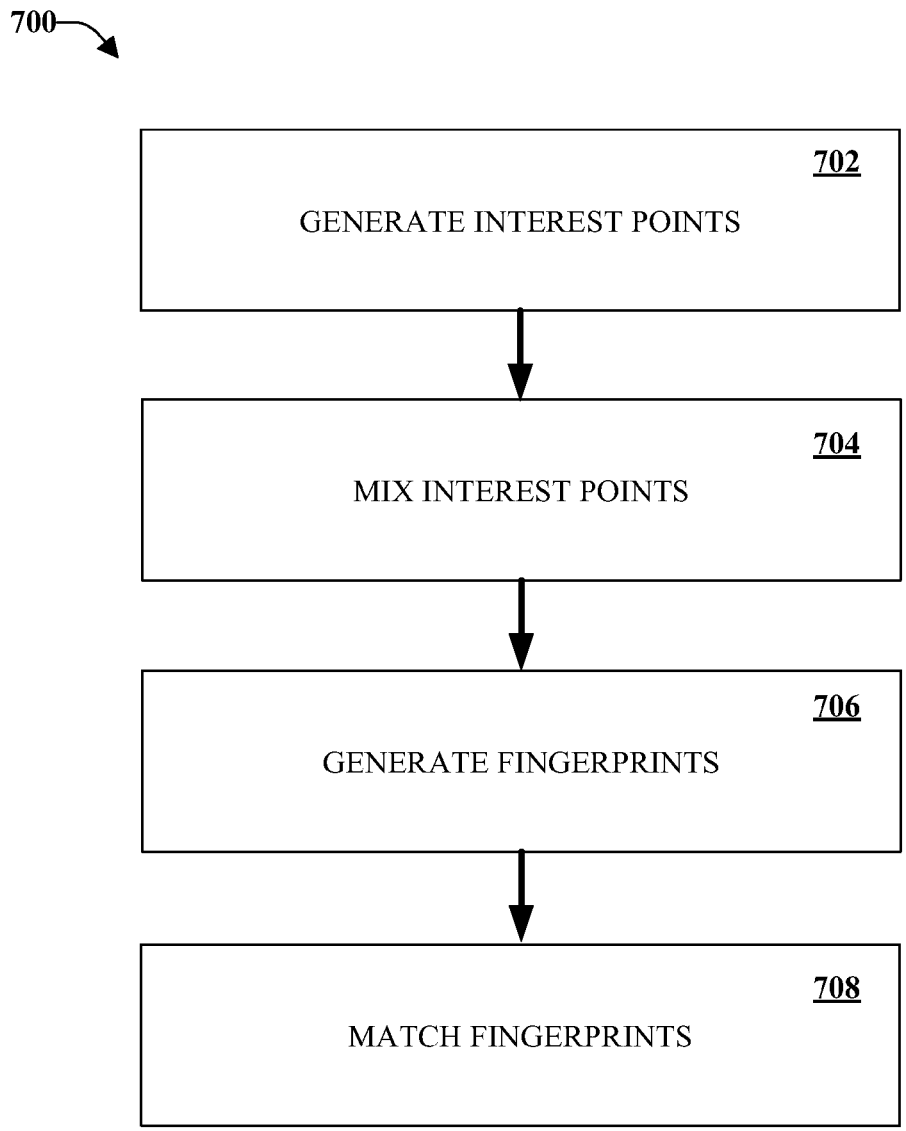
FIG. 7 illustrates an example methodology for matching audio using interest point mixing.

FIG. 7 illustrates an example methodology 700 for matching audio using interest point mixing, e.g., using system 200 as shown in FIG. 2. At 702, two or more interest point detection methods are employed to generate a set of respective interest points for an audio sample. At 704, a set of mixed interest points is generated for the audio sample based on the set of respective interest points. In accordance with some aspects, generating a mixed set of interest points can include assigning a first weight to a first set of interest points and a second weight to a second set of interest points. At 706, a fingerprint is generated based on the mixed set of interest points. At 708, the fingerprint is matched with reference fingerprints to determine an identity of the audio sample.

Figure 8:
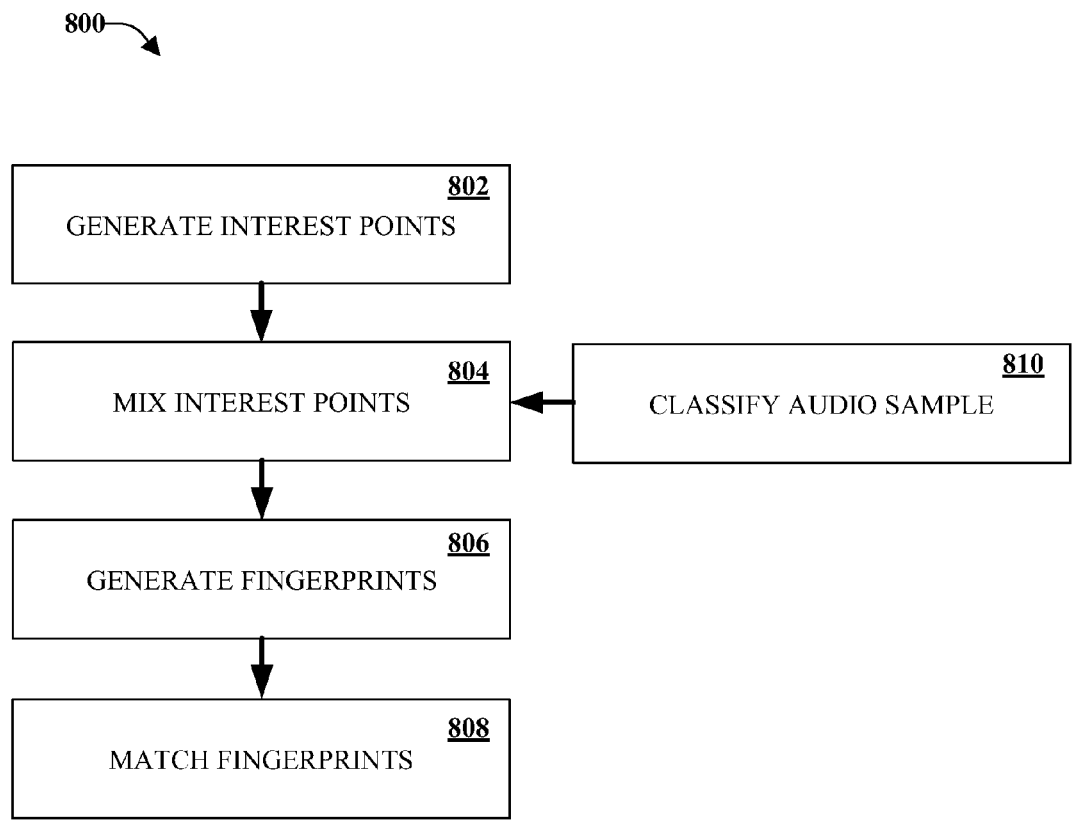
FIG. 8 illustrates an example methodology for matching audio using classification and interest point mixing.

FIG. 8 illustrates an example methodology 800 for matching audio using classification and interest point mixing, e.g., using system 200 as shown in FIG. 3. At 802, two or more interest point detection methods are employed to generate a set of respective interest points for an audio sample. At 804, a set of mixed interest points is generated for the audio sample based on the set of respective interest points. In accordance with some aspects, generating a mixed set of interest points can include assigning a first weight to a first set of interest points and a second weight to a second set of interest points. At 810, the audio sample is probed to determine a classification. In accordance with some aspects, assigning a first weight to a first set of interest points and a second weight to a second set of interest points is based upon the classification. At 806, a fingerprint is generated based on the mixed set of interest points. At 808, the fingerprint is matched with reference fingerprints to determine an identity of the audio sample.

Figure 9:
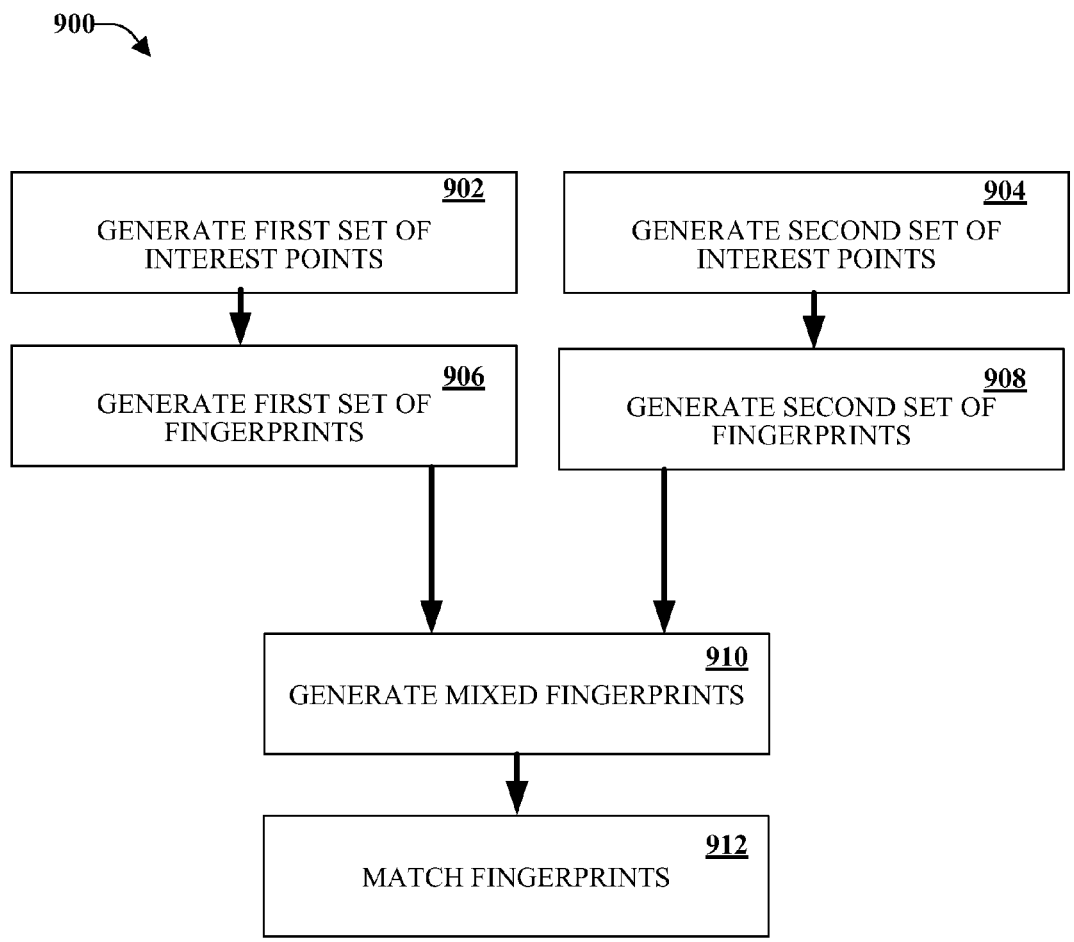
FIG. 9 illustrates an example methodology for matching audio using fingerprint mixing.

FIG. 9 illustrates an example methodology 900 for matching audio using fingerprint mixing, e.g., using system 400 as shown in FIG. 4. At 902, a first set of interest points is generated for an audio sample based upon a first interest point detection method. At 904, a second set of interest points is generated for the audio sample based upon a second interest point detection method. The first set of interest points is used at 906 to generate a first set of fingerprints. At 908, a second set of fingerprints is generated based upon the second set of interest points. At 910, a mixed set of fingerprints is generated based upon the first set of fingerprints and the second set of fingerprints. At 912, the mixed set of fingerprints is matched with reference fingerprints to determine the identity of the audio sample.

Figure 10:
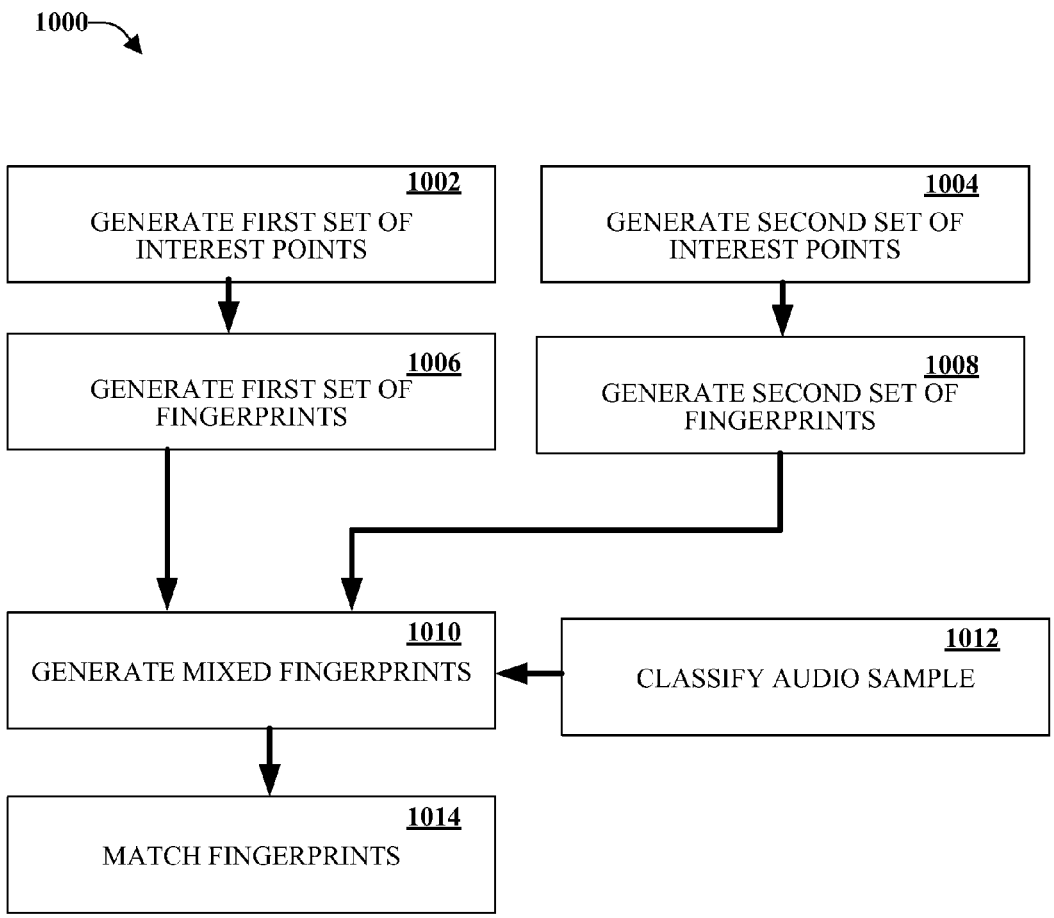
FIG. 10 illustrates an example methodology for matching audio using classification and fingerprint mixing.

FIG. 10 illustrates another methodology 1000 for matching audio using classification and fingerprint mixing, e.g., using system 400 as shown in FIG. 5. At 1002, a first set of interest points is generated for an audio sample based upon a first interest point detection method. At 1004, a second set of interest points is generated for the audio sample based upon a second interest point detection method. At 1006, a first set of fingerprints are generated based upon the first set of interest points. At 1008, a second set of fingerprints is generated based upon the second set of interest points. At 1010, a mixed set of fingerprints is generated based upon the first set of fingerprints and the second set of fingerprints. In accordance with some aspects, the audio sample is further probed at 1012 and classified. The mixed set of fingerprints can be generated by assigning a first weight to the first set of interest points and second weight to a second set of interest points based upon the classification. At 1014, the mixed set of fingerprints is matched with reference fingerprints to determine the identity of the audio sample.

Figure 11:
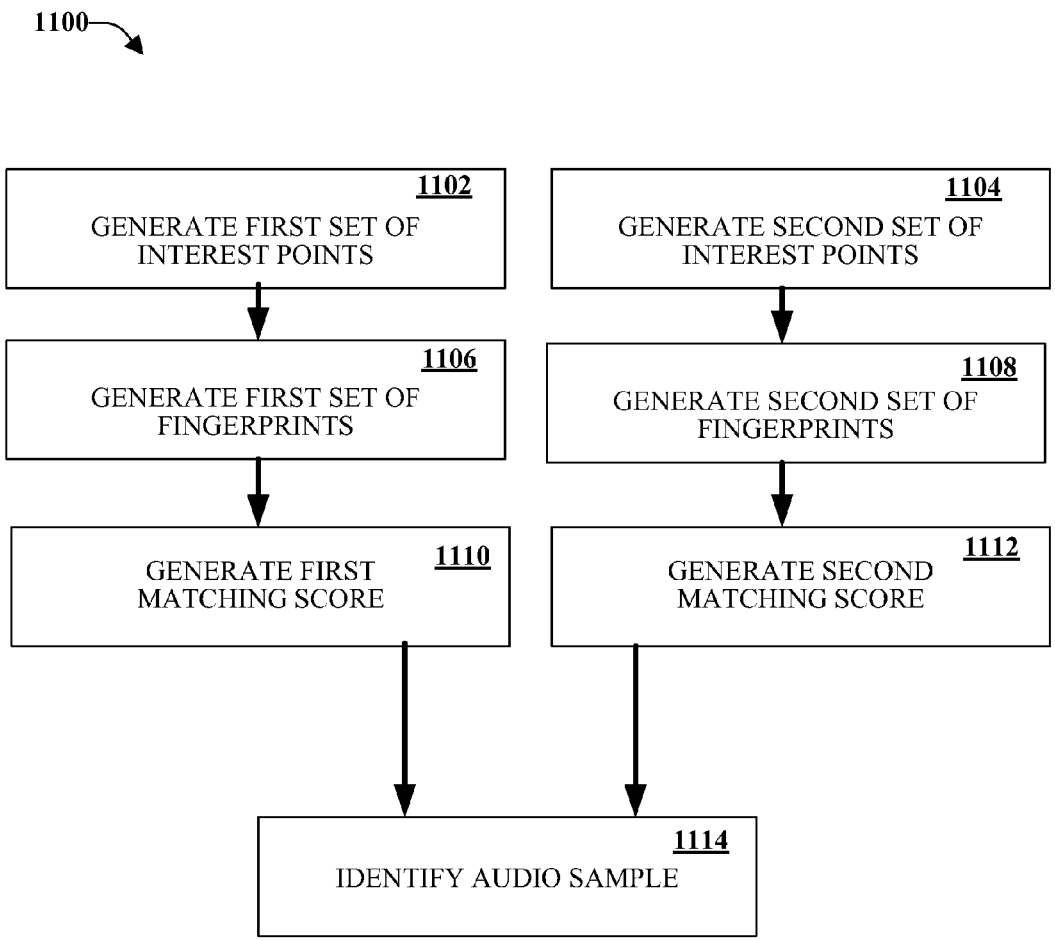
FIG. 11 illustrates an example methodology for matching audio using matching score mixing.

FIG. 11 illustrates an example methodology 1100 for matching audio using matching score mixing, e.g., using system 600. At 1102 a first set of interest points is generated for an audio sample based upon a first interest point detection method. At 1104 a second set of interest points is generated for an audio sample based upon a second interest point detection method. At 1106, a first set of fingerprints is generated based upon the first set of interest points. At 1108, a second set of fingerprints is generated based upon the second set of interest points.

At 1110 a first matching score is generated based upon comparing the first set of fingerprints with reference fingerprints. At 1112 a second matching score is generated based upon comparing the first set of fingerprints with reference fingerprints. Matching scores can represent the probability that the audio sample matches an individual reference sample. In one embodiment, matching scores can also include the probabilities that the audio sample matches a plurality of reference samples wherein the matching score for each reference sample is based upon the probability that the audio sample matches a reference sample.

At 1114, the audio sample is identified based upon at least the first matching score and the second matching score. In one embodiment, a set of matching scores is used to predict whether there is match between the audio sample and an individual reference sample. Probabilistic machine learning techniques can be used in using matching scores to identify the audio sample.

Reference throughout this specification to "one implementation" or "an implementation" or "one embodiment" or "an embodiment" means that a particular feature, structure, or characteristic described in connection with the implementation is included in at least one implementation or embodiment. Thus, the appearances of the phrase "in one implementation" or "in an implementation" or "in one embodiment" or "in an embodiment" in various places throughout this specification are not necessarily all referring to the same implementation or same embodiment. Furthermore, the particular features, structures, or characteristics may be combined in any suitable manner in one or more implementations or embodiments.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or fingerprints); software on a computer readable medium; or a combination thereof.

In order to provide for or aid in the numerous inferences described herein, components described herein can examine the entirety or a subset of data available and can provide for reasoning about or infer states of a system, environment, and/or client from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 12:
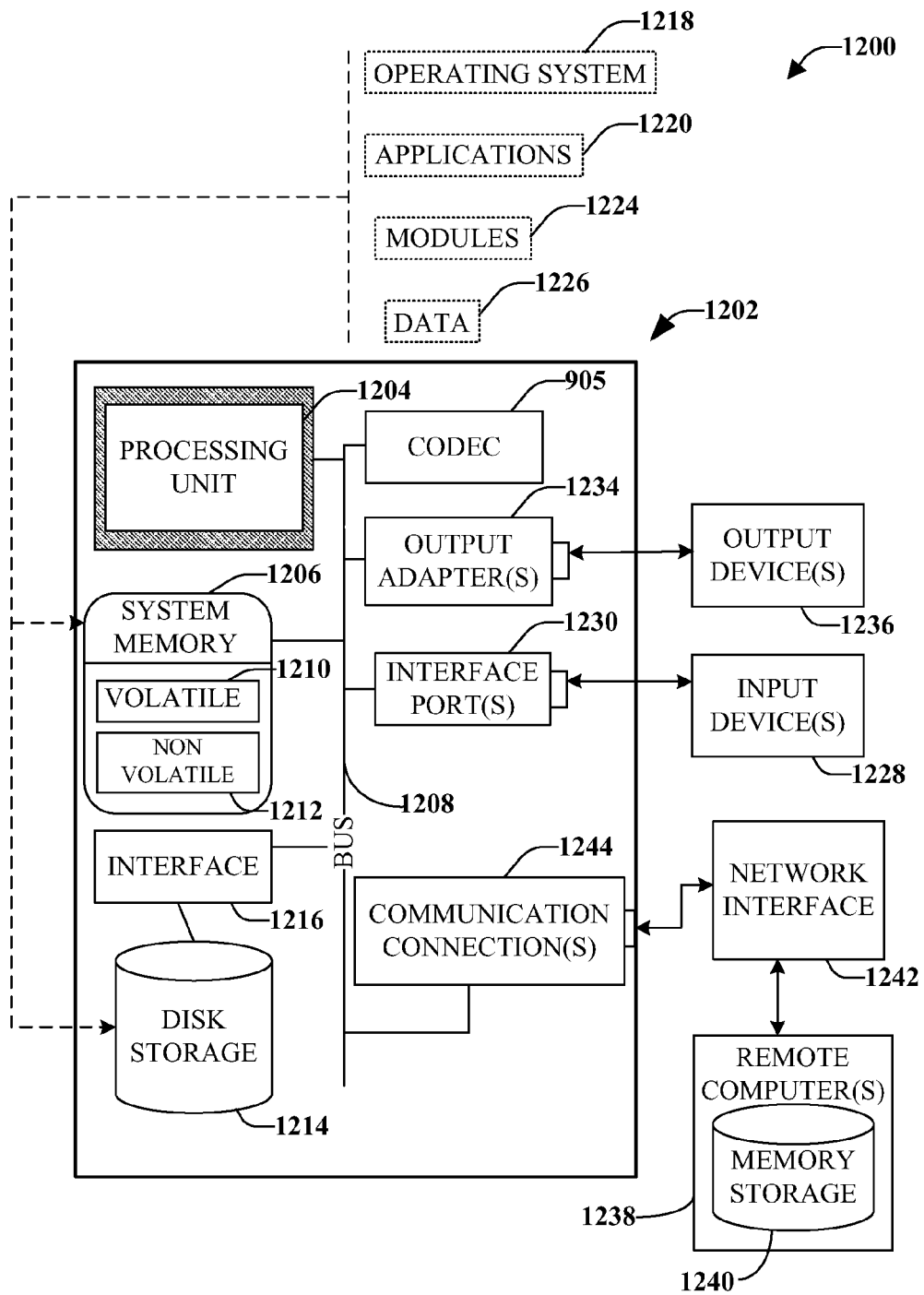
FIG. 12 illustrates an example schematic block diagram for a computing environment in accordance with the subject specification.

With reference to FIG. 12, a suitable environment 1200 for implementing various aspects of the claimed subject matter includes a computer 1202. The computer 1202 includes a processing unit 1204, a system memory 1206, a codec 1205, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1206 includes volatile memory 1210 and non-volatile memory 1212. The basic input/output system (BIOS), containing the basic routines to transfer information between elements within the computer 1202, such as during start-up, is stored in non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), or flash memory. Volatile memory 1210 includes random access memory (RAM), which acts as external cache memory. According to present aspects, the volatile memory may store the write operation retry logic (not shown in FIG. 12) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 1202 may also include removable/non-removable, volatile/non-volatile computer storage media. FIG. 12 illustrates, for example, a disk storage 1214. Disk storage 1214 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1214 to the system bus 1208, a removable or non-removable interface is typically used, such as interface 1216.

It is to be appreciated that FIG. 12 describes software that acts as an intermediary between users and the basic computer resources described in the suitable operating environment 1200. Such software includes an operating system 1218. Operating system 1218, which can be stored on disk storage 1214, acts to control and allocate resources of the computer system 1202. Applications 1220 take advantage of the management of resources by operating system 1218 through program modules 1224, and program data 1226, such as the boot/shutdown transaction table and the like, stored either in system memory 1206 or on disk storage 1214. It is to be appreciated that the claimed subject matter can be implemented with various operating systems or combinations of operating systems.

A user enters commands or information into the computer 1202 through input device(s) 1228. Input devices 1228 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s) 1228. Thus, for example, a USB port may be used to provide input to computer 1202, and to output information from computer 1202 to an output device 1236. Output adapter 1234 is provided to illustrate that there are some output devices 1236 like monitors, speakers, and printers, among other output devices 1236, which require special adapters. The output adapters 1234 include, by way of illustration and not limitation, video and sound cards that provide a means of connection between the output device 1236 and the system bus 1208. It should be noted that other devices and/or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244. Network interface 1242 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

Figure 13:
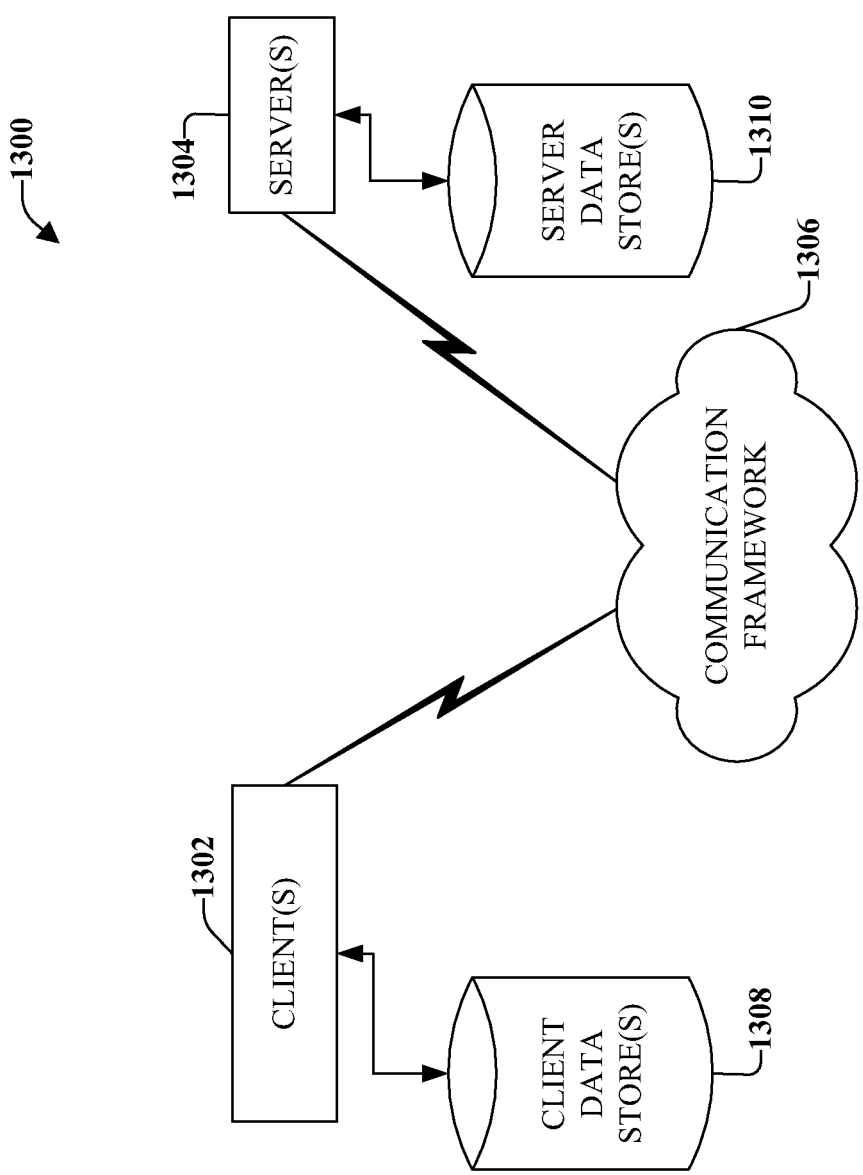
FIG. 13 illustrates an example block diagram of a computer operable to execute the disclosed architecture.

Referring now to FIG. 13, there is illustrated a schematic block diagram of a computing environment 1300 in accordance with the subject specification. The system 1300 includes one or more client(s) 1302, which can include an application or a system that accesses a service on the server 1304. The client(s) 1302 can be hardware and/or software (e.g., threads, processes, computing devices). The client(s) 1302 can house cookie(s) and/or associated contextual information by employing the specification, for example.

The system 1300 also includes one or more server(s) 1304. The server(s) 1304 can also be hardware or hardware in combination with software (e.g., threads, processes, computing devices). The servers 1304 can house threads to perform, for example, interest point detection, mixing, fingerprint generation, matching score generation, or fingerprint comparisons in accordance with the subject disclosure. One possible communication between a client 1302 and a server 1304 can be in the form of a data packet adapted to be transmitted between two or more computer processes where the data packet contains, for example, an audio sample. The data packet can include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304. For example, data store(s) 1310 can contain the fingerprints of reference samples in accordance with this disclosure.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methodologies for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system, comprising:
 a memory that stores computer executable components; and
 a processor that executes the following computer executable components stored within the memory;
  an interest point detection component that concurrently employs a first interest point detection method to generate a first set of interest points for an audio sample and a second interest point detection method to generate a second set of interest points for the audio sample;
  a classification component that probes the audio sample to determine a classification of the audio sample that includes at least a type of media capable device that provided the audio sample;
  a mixing component that generates a mixed set of interest points for the audio sample that comprises a subset of the first set of interest points and a subset of the second set of interest points, wherein the subset of the first set of interest points is determined based on the classification of the audio sample and information associated with the first interest point detection method, and the subset of the second set of interest points is determined based on the classification of the audio sample and other information associated with the second interest point detection method, wherein the mixing component generates the mixed set of interest points by assigning a first weight to the first set of interest points based on the classification of the audio sample and the information associated with the first interest point detection method, and assigning a second weight to the second set of interest points based on the classification of the audio sample and the other information associated with the second interest point detection method;

a fingerprint component that generates a fingerprint of the audio sample based on the mixed set of interest points; and a matching component that identifies the audio sample based on a comparison between the fingerprint of the audio sample and one or more reference fingerprints.

2. A method, comprising:

concurrently employing, by a system including a processor, a first interest point detection method to generate a first set of interest points for an audio sample and a second interest point detection method to generate a second set of interest points for the audio sample;

probing, by the system, the audio sample to determine a classification of the audio sample that includes at least a type of media capable device that provided the audio sample;

generating a mixed set of interest points for the audio sample that comprises a portion of the first set of interest points and a portion of the second set of interest points, wherein the portion of the first set of interest points is determined based on the classification of the audio sample and information associated with the first interest point detection method, and the portion of the second set of interest points is determined based on the classification of the audio sample and other information associated with the second interest point detection method, wherein the generating the mixed set of interest points comprises assigning a first weight to the first set of interest points based on the classification of the audio sample and the information associated with the first interest point detection method, and assigning a second weight to the second set of interest points based on the classification of the audio sample and the other information associated with the second interest point detection method;

generating a fingerprint based on the mixed set of interest points; and matching the fingerprint with one or more reference fingerprints to determine an identity of the audio sample.

3. The method of claim 2, further comprising determining, by the system, accuracy of the first interest point detection method and the second interest point detection method via a trained machine learning algorithm.

4. A non-transitory computer-readable medium having instructions stored thereon that, in response to execution, cause a system including a processor to perform operations comprising:

concurrently generating a first set of interest points for an audio sample using a first interest point detection method and a second set of interest points for the audio sample using a second interest point detection method;

probing the audio sample to determine a classification of the audio sample that includes at least a type of media capable device that provided the audio sample;

generating a mixed set of interest points for the audio sample that comprises a portion of the first set of interest points and a portion of the second set of interest points, wherein the portion of the first set of interest points is determined based on the classification of the audio sample and information associated with the first interest point detection method, and the portion of the second set of interest points is determined based on the classification of the audio sample and other information associated with the second interest point detection method, wherein the generating the mixed set of interest points comprises assigning a first weight to the first set of interest points based on the classification of the audio sample and the information associated with the first interest point detection method, and assigning a second weight to the second set of interest points based on the classification of the audio sample and the other information associated with the second interest point detection method;

generating a fingerprint based on the mixed set of interest points; and matching the fingerprint with one or more reference fingerprints to determine an identity of the audio sample.

5. The non-transitory computer-readable medium of claim 4, determining accuracy of the first interest point detection method and the second interest point detection method via a trained machine learning process.

6. A system, comprising:

means for concurrently generating a first set of interest points for an audio sample using a first interest point detection method and a second set of interest points for the audio sample using a second interest point detection method;

means for probing the audio sample to determine a classification of the audio sample that includes at least a type of media capable device that provided the audio sample;

means for generating a mixed set of interest points for the audio sample that comprises a portion of the first set of interest points and a portion of the second set of interest points, wherein the portion of the first set of interest points is determined based on the classification of the audio sample and information associated with the first interest point detection method, and the portion of the second set of interest points is determined based on the classification of the audio sample and other information associated with the second interest point detection method, wherein the generating the mixed set of interest points comprises assigning a first weight to the first set of interest points based on the classification of the audio sample and the information associated with the first interest point detection method, and assigning a second weight to the second set of interest points based on the classification of the audio sample and the other information associated with the second interest point detection method;

means for generating a fingerprint based on the mixed set of interest points; and means for matching the fingerprint with one or more reference fingerprints to determine an identity of the audio sample.

7. The system of claim 6, further comprising means for determining accuracy of the first interest point detection method and the second interest point detection method via a trained machine learning process.

8. A device, comprising:
a memory; and
a processor configured to:
concurrently generate a first set of interest points for an audio sample using a first interest point detection method and a second set of interest points for the audio sample using a second interest point detection method;
examine the audio sample to determine a classification of the audio sample that includes at least a type of media capable device that provided the audio sample;
create a mixed set of interest points for the audio sample that comprises a portion of the first set of interest points and a portion of the second set of interest points, wherein the portion of the first set of interest points is determined based on the classification of the audio sample and information associated with the first interest point detection method, and the portion of the second set of interest points is determined based on the classification of the audio sample and other information associated with the second interest point detection method, wherein the creation of the mixed set of interest points comprises assignment of a first weight to the first set of interest points based on the classification of the audio sample and the information associated with the first interest point detection method, and assignment of a second weight to the second set of interest points based on the classification of the audio sample and the other information associated with the second interest point detection method;
generate a fingerprint based on the mixed set of interest points; and
match the fingerprint with one or more reference fingerprints to determine an identity of the audio sample.

9. An audio matching server, comprising:
a processor, communicatively coupled to a memory that stores computer-executable instructions, that executes or facilitates execution of the computer-executable instructions, comprising:
an audio matching component configured to:
concurrently generate a first set of interest points for an audio sample using a first interest point detection method and a second set of interest points for the audio sample using a second interest point detection method;
analyze the audio sample to determine a classification of the audio sample that includes at least a type of media capable device that provided the audio sample;
produce a mixed set of interest points for the audio sample that comprises a portion of the first set of interest points and a portion of the second set of interest points, wherein the portion of the first set of interest points is determined based on the classification of the audio sample and information associated with the first interest point detection method, and the portion of the second set of interest points is determined based on the classification of the audio sample and other information associated with the second interest point detection method, wherein the production of the mixed set of interest points comprises assignment of a first weight to the first set of interest points based on the classification of the audio sample and the information associated with the first interest point detection method, and assignment of a second weight to the second set of interest points based on the classification of the audio sample and the other information associated with the second interest point detection method;
produce a fingerprint based on the mixed set of interest points; and
match the fingerprint with one or more reference fingerprints to determine an identity of the audio sample.

10. The audio matching server of claim 9, wherein the audio matching component is further configured to determine accuracy of the first interest point detection method and the second interest point detection method via a trained machine learning algorithm.

11. The device of claim 9, wherein the processor is further configured to determine accuracy of the first interest point detection method and the second interest point detection method via a trained machine learning classifier.

12. The system of claim 1, a trained machine learning component configured to determine accuracy of the first interest point detection method and the second interest point detection method.

\* \* \* \* \*